April 21, 1942.  C. BRONNER, SR  2,280,684
MEANS FOR PRODUCING LIGHT EFFECTS
Filed April 12, 1939  3 Sheets-Sheet 1

INVENTOR
Cleveland Bronner Sr.
BY William F. Keyrer
ATTORNEY

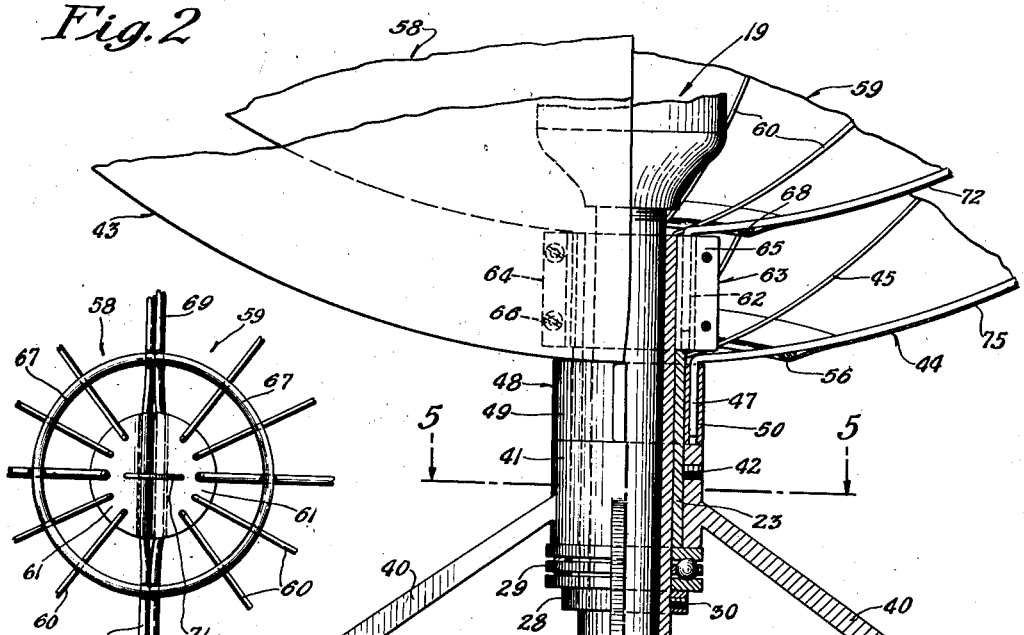
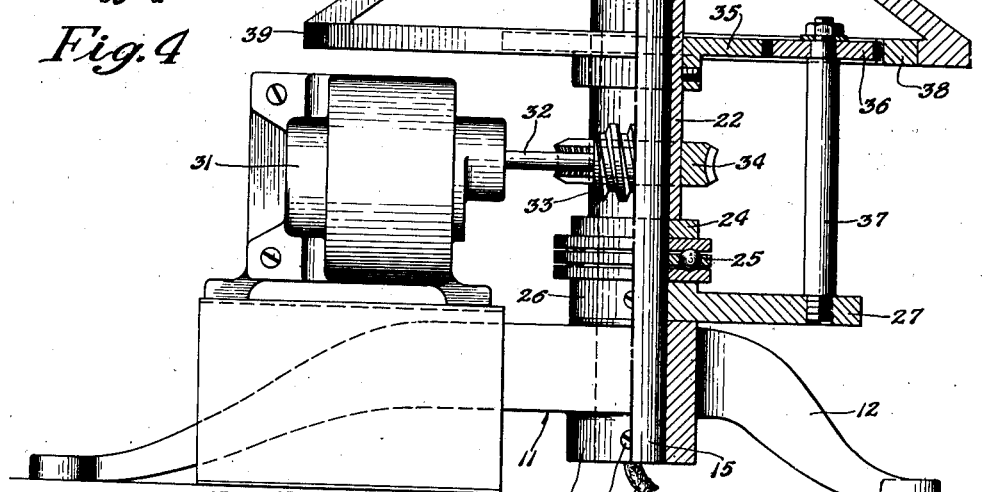

April 21, 1942.   C. BRONNER, SR   2,280,684
MEANS FOR PRODUCING LIGHT EFFECTS
Filed April 12, 1939   3 Sheets-Sheet 3
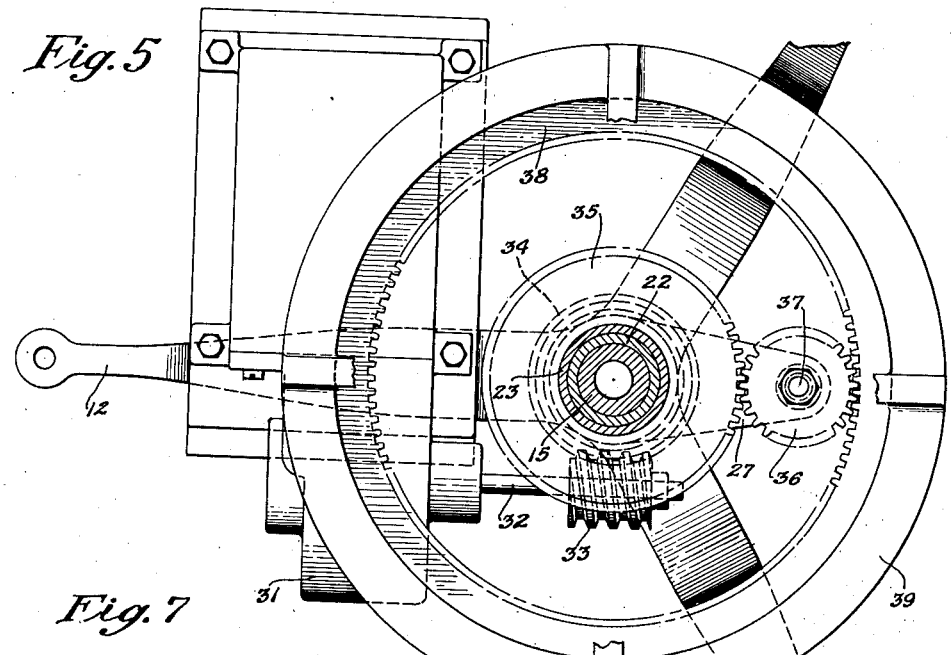
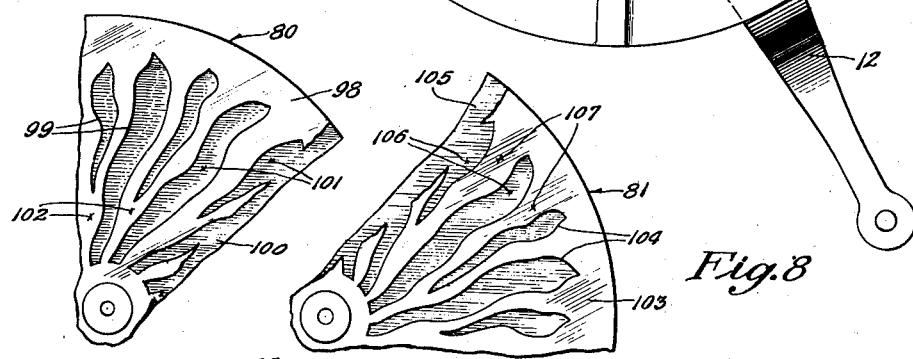
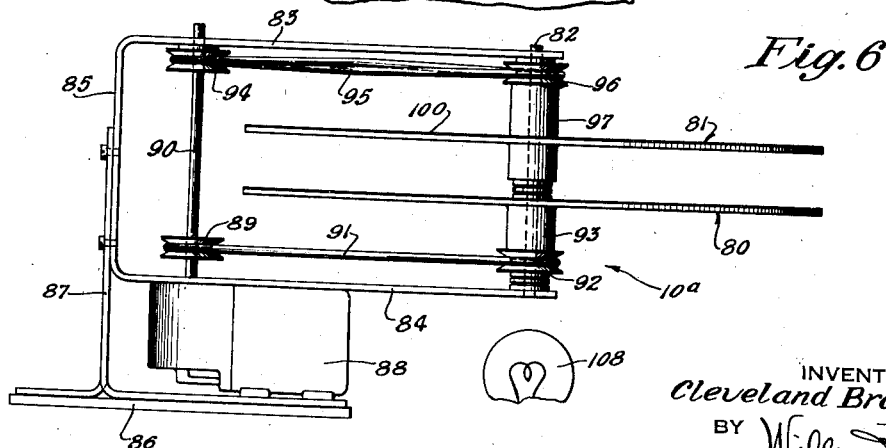
INVENTOR
*Cleveland Bronner Sr.*
BY *William F. Veyrer*
ATTORNEY Patented Apr. 21, 1942

2,280,684

UNITED STATES PATENT OFFICE 2,280,684

MEANS FOR PRODUCING LIGHT EFFECTS

Cleveland Bronner, Sr., Norwalk, Conn.

Application April 12, 1939, Serial No. 267,388

4 Claims. (Cl. 240—10.1)

This invention relates to means for producing light effects.

It is an object of the invention to provide a means for screening light coming from a light source in such a way that novel and unusual light effects may be produced.

It is a further object of the invention to provide a means for projecting and screening light so that the effect of a flow of color is produced.

It is another object of the invention to provide a means for securing a color effect, the pattern of which is constantly changing.

In the attainment of the above and other objects, there is provided as a feature of the invention a means involving the directing of light through at least two light-screening surfaces having defined light-transmitting sections, while moving the light-screening surfaces in opposite directions transverse the light passing therethrough.

Another feature of the invention resides in moving the aforementioned light-screening surfaces at different speeds to create constantly changing light or color effects which repeat, if at all, at very long intervals of time.

Another feature of invention resides in so disposing the defined light-transmitting surfaces in the respective screens relative to each other and to the direction or line of movement thereof, that the effect of a flow of light or color is produced by the light projected therethrough.

Features related to the above, reside in the provision of an efficient device or means by which the aforementioned objects may be readily and easily obtained.

Other objects and features will hereinafter appear.

In the drawings:

Fig. 2 is an enlarged fragmentary detail view, partially in section, of the device shown in Fig. 1.

Fig. 3 is a fragmentary detail view, looking downwardly, showing the bottom of the inner and outer frames.

Fig. 4 is a view similar to Fig. 3 but showing only the top of the inner frame.

Fig. 5 is a sectional view taken on the line 5—5 of Fig. 2, certain of the parts being broken away to enable a more clear illustration.

Fig. 6 is a side view showing a modified form of the device.

Fig. 7 is a fragmentary detail view showing one of the light screening discs shown in Fig. 6.

Fig. 8 is a fragmentary detail view showing another of the light screening discs shown in Fig. 6.

Figure 1:
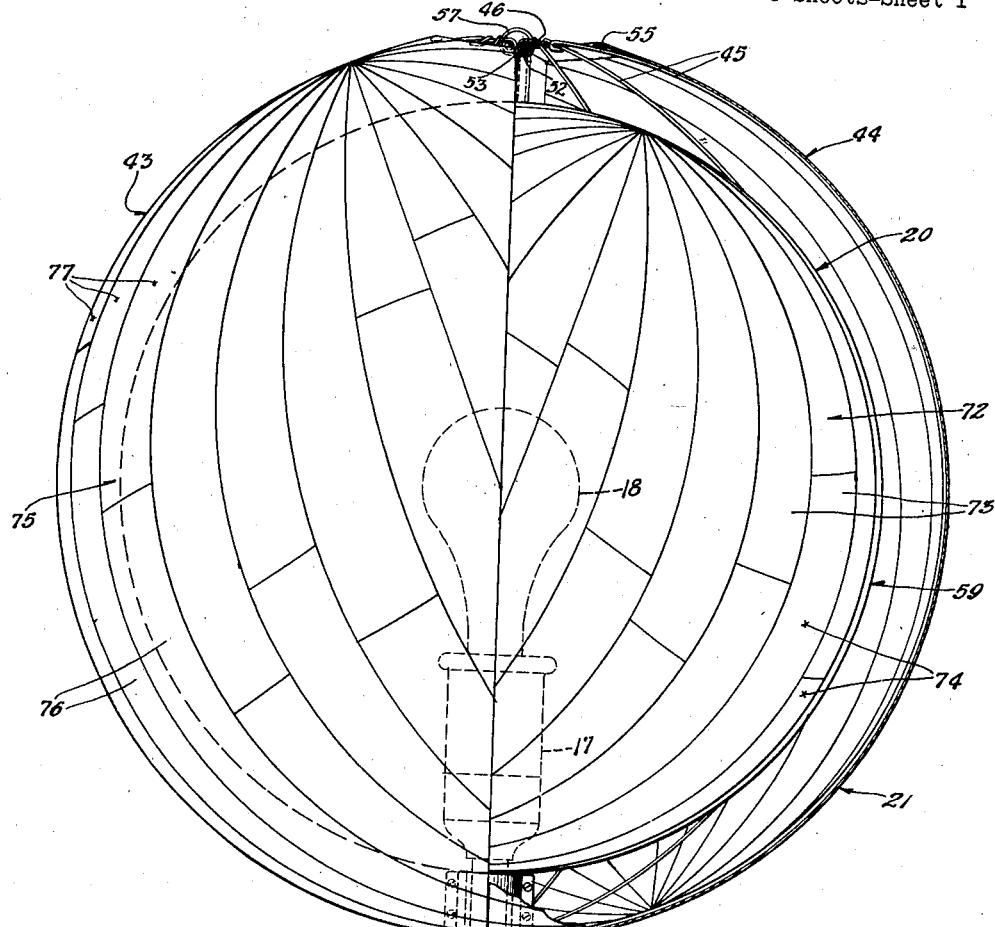
Figure 1 is a side view of one form of the device provided by the present invention for producing light effects, certain of the parts being broken away to enable a more clear illustration.

Before describing the present improvements and mode of operation thereof in detail it should be understood that the invention is not limited to the details of construction and arrangement of parts shown in the accompanying drawings, which are merely illustrative of the present preferred embodiments, since the invention is capable of other embodiments, and the phraseology employed is for the purpose of description and not of limitation.

Referring more particularly to the drawings and first to Figs. 1 through 5, there is shown a device 10 constituting one form of the present invention for producing light effects, provided with a base 11 having legs 12 and fixedly supporting in a central hub section 13, as by a screw 14, a hollow standard 15 through which a suitable electrical conductor 16 is directed to a lamp socket 17 supported at the upper end thereof and adapted to receive an electric light bulb 18 which constitutes a light source 19 for the device 10.

Positioned about the light source 19 are an inner wire frame 20 and an outer wire frame 21, which, as shown, are substantially spherical in form and mounted for rotary movement in opposite directions about the standard 15 as an axis. For thus mounting the substantially spherical frames 20 and 21, there are positioned on the standard 15 an inner sleeve member 22 and an outer sleeve member 23.

As shown the inner sleeve member, which is freely rotatable on the standard 15 rests at its lower end upon a collar 24 between which and the base 11 are interposed a thrust bearing 25 and a collar section 26 on a laterally extending supporting arm 27 fixed to the standard. The outer sleeve member 23 is freely rotatable on the inner sleeve member 22 and is supported relative thereto by a collar 28 and intermediate thrust bearing 29. A set screw 30 may be conveniently provided for fixing the collar 28 relative to the inner sleeve member.

For concurrently rotating the inner and outer sleeve members in opposite directions there may be provided a suitable electric motor 31 having a shaft 32 with a worm gear 33 thereon adapted to engage a cooperating gear 34 fixed to the inner sleeve. As the inner sleeve is rotated in one direction, the outer sleeve is rotated in the other direction by a chain of gears including a gear 35 fixed to the inner sleeve, an idler gear 36 supported on a stem 37 on the arm 27, and an internal gear 38 carried by a rim 39 connected through arms 40 to a hub 41 fixed to the outer sleeve 23 as by a set screw 42.

Preferably, and as shown, the outer frame 21 is made in two substantially hemispherical parts 43 and 44, each part comprising a series of wires 45 connected at their upper ends to a semicircular plate 46 and bent at their lower ends to provide portions 47 anchored in a split collar 48 having two parts 49 and 50 adapted to be clamped together, as by screws 51, about the outer sleeve 23. Also, each part of the outer frame includes a main stay wire 52 held by a turned under tongue 53 on the plate and having its ends bent to provide portions 54 anchored in one part of the split collar 48. To rigidify the outer frame, as shown, transverse wires 55 and 56 are provided adjacent the top and bottom respectively of each frame part 43 and 44 and are suitably fixed to the main stay wire 52 and the wires 45 as by solder or the like. With this construction the outer frame 21 may be easily inserted in place over the inner frame 20 by merely pivoting the two parts 43 and 44 about a link 57 connecting the semi-circular plates 46, and then closing the frame by clamping the split collar 48 on the outer sleeve 23.

The inner frame 20 may, as shown, be similarly formed of two pivotably connected parts 58 and 59, each part being built of a series of wires 60 connected at their upper ends to a semicircular plate 61 and bent at their lower ends to provide portions 62 anchored in a split collar 63 having its two parts 64 and 65 clamped to the projecting upper end of the inner sleeve 22 as by screws 66. Also, as in the case of the outer frame 21, each of the parts of the inner frame 20 includes rigidifying upper and lower transverse wires 67 and 68 connected as by solder to the wires 60 and to a main stay wire 69 held by a turned under tongue on the plate 61 and having its ends bent to provide portions 70 anchored in one part of the split collar. As with the outer frame 21, a link 71 is provided for pivotally connecting the semi-circular plates 61 on the respective frame parts 58 and 59.

Of importance, the inner spherical frame is covered to provide a light screen 72 comprising a plurality of defined light-transmitting sections 73 each of which may, as shown, be built up of a plurality of different colored strips 74 of theatrical gelatine. It is to be particularly noted that the colors of the gelatine strips are so selected that adjacent strips 74 in successive sections 73 are of different color so that consecutive sections have different light-transmitting characteristics. Thus, for example one section may be built up of yellow and green colored gelatine strips and an adjacent section may be built up of blue and red colored gelatine strips.

The outer frame 21 is similarly covered to provide a light screen 75 comprising a plurality of defined light-transmitting sections 76, each of which, as shown, may be built up of a plurality of different colored theatrical gelatine strips 77. Of importance, and as in the case of the inner screen, the colors of the gelatine strips are so selected that adjacent strips in successive sections 76 are of different color so that consecutive sections have different color transmitting characteristics.

To make possible the advantageous color flow effect produced by the device, it is to be especially noted that the sections 73 and 76 in the respective screening surfaces 72 and 75 are placed at an angle on the spherical frames 20 and 21, that is the sections are so disposed that as they and the frames are rotated about the standard 15 as an axis they lean relative to the line of movement of the screening surfaces. In the form disclosed this angular disposition of the sections 73 and 76 on the respective frames is achieved by laying the gelatine strips on the frames so as to radiate from axes of the frames angularly disposed with respect to the axis defined by the standard 15.

Also of importance in achieving the color flow effect, it is to be noted, as shown most clearly in Fig. 1, the sections 73 and 76 in the respective superposed spherical screens or screening surfaces 72 and 75 are so disposed that as the frames are rotated they lean or incline in opposite directions relative to the direction of movement of one of the surfaces.

In the operation of the device, when the screens 72 and 75 are rotated in opposite directions the angular crossing of the inclined sections in the superposed screening surfaces modifies the light passing therethrough and thus creates the effect of a flow of color on any light-interrupting surface on which the light from the device 10 is projected. In the form shown, if the inclination or leaning of the sections in the respective screening surfaces is toward the direction of movement of the screen a shower or color flow effect is produced which flows downward, whereas if the inclination is in the other direction the shower or color effect produced is upward.

Various color patterns and combinations may be produced by altering the size and shape of the sections and by changing the color combinations in the sections. Also the projected pattern may be further modified by placing masks having different sizes or shapes of openings over the outer or inner spherical screens. And, of importance, to insure a color effect which is constantly changing and which will repeat, if at all, at very long time intervals the gear ratio utilized in rotating the respective screens is preferably adjusted so that the screens not only move in opposite directions but at different speeds so that the same sections in the respective screens will not always be moved into superposed relation at the same point in the movement thereof.

The form of device 10 above described, while it may be satisfactorily used to project color on surfaces of divers shapes, is most effective when used in a circular or spherical room where the flow of color will completely cover all sides as well as the ceiling and floor.

However, the same basic method of passing color through two screening surfaces moving in opposite directions and formed with defined light-transmitting sections inclined in opposite directions relative to the direction of movement of one of the surfaces is susceptible of performance with other devices, such for example as the modified form of device 10a illustrated in Figs. 6, 7 and 8.

As shown, the modified device 10a includes a pair of superposed inner and outer light screens 80 and 81 in the form of flat discs mounted for rotation in opposite directions about a common axis provided by a pin 82 supported between arms 83 and 84 on a supporting bracket 85 fixed to a base 86 by an upstanding arm 87. An electric motor 88 may be advantageously provided for rotating the disc screens 80 and 81 in opposite directions through the intermediary of a pulley 89 on the motor shaft 90 connected by a belt 91 to a pulley 92 on a hub 93 on the disc screen 80, and a pulley 94 on the motor shaft connected by a crossed belt 95 with a pulley 96 on a hub 97 on the other disc screen 81.

In the form illustrated the inner disc screen 80 includes a disclike opaque frame 98 having openings 99 therein extending toward the periphery from the central portion thereon. Of importance it is to be noted that these openings do not extend along radii of the disc but are angularly offset so as to lean or incline relative to the direction movement of the disc. Closing the openings 99, as shown, there is a sheet 100 of light-transmitting colored theatrical gelatine which where it overlies the openings provides screening sections 101 having different light-transmitting characteristics than the sections 102 provided by th opaque frame 98 intermediate the openings 99.

The outer disc screen 81 is of similar construction including an opaque frame 103 having openings 104 therein closed by a sheet 105 of light-transmitting colored theatrical gelatine, to thereby provide adjacent sections 106 and 107 with different light-transmitting characteristics. Of importance, however, it is to be noted that the inclination of the gelatine closed openings 104 in the outer disc is in a direction opposite to that of the inclination of the openings 99 in the inner disc.

When a light from a source, such as an electric light bulb 108, is directed through the screens 80 and 81 it is qualified by the sections 101 and 102 and the sections 106 and 107 as they are moved relative to each other, the inclination of the colored sections producing the effect of a flow of color on any light-interrupting surface, as for example a wall, on which light from the device is projected. If the inclination of the colored sections in the respective screens is toward the direction of movement thereof the effect produced is a radially inward flow of color, while if the inclination is in the opposite direction the effect produced is a radially outward flow of color. Preferably and in order that the combination or pattern of the color effect may repeat, if at all, at long time intervals the screens are rotated at different speeds as by controlling the ratio of sizes of the pulleys. The form of pattern produced in the effect may be regulated by changing the shape of the designs formed by the openings or by using masks of different designs, and by using glass or gelatine sheets of various colors to provide one or more different colored light-transmitting sections in one or both of the screens, the projected color combinations may be varied.

Figure 9:
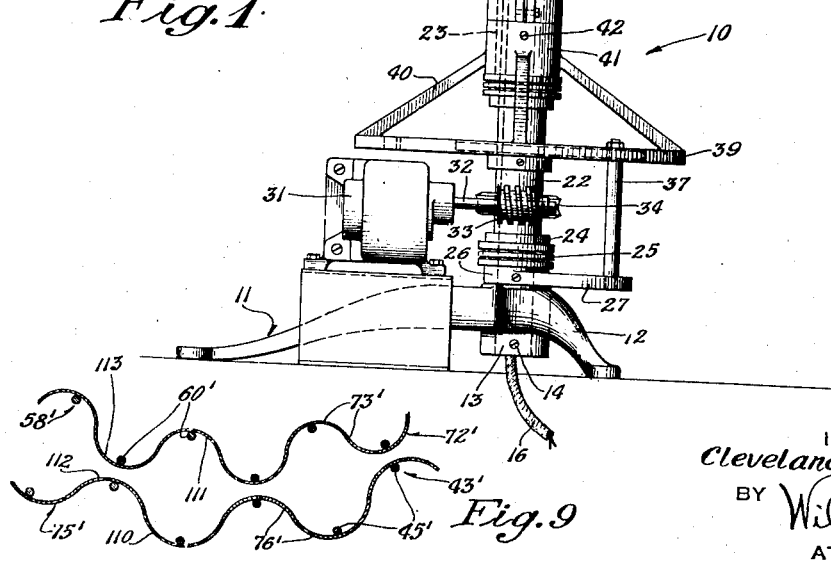
Fig. 9 is an essentially diagrammatic showing of a modification of the present invention.

If desired and as shown diagrammatically in Fig. 9 further novel light effects may be produced by so shaping the light screens through which the light passes that the spacing of the screens varies as they pass a given point in their movement relative to each other and to the light source. In achieving this result, for example, in a device having a substantially spherical shape such as the one shown in Fig. 1, wires 45' and 60' in frames 43' and 58' respectively may be, as shown in Fig. 9, disposed so that the distance between the superposed frames 43' and 58' varies to correspondingly vary the distance between the light screens 75' and 72' carried thereby.

With this modified construction as the wavy surfaces of the screens are moved relatively to each other, when a projection 110 in the outer screen 75' is opposite a depression 111 in the inner screen 72' the light passing therethrough is modified in one way, when a depression 112 in the outer screen 75' is opposite a projection 113 in the inner screen 72' the light passing therethrough is modified in another way, when a projection 110 in the outer screen is opposite a projection 113 in the inner screen the light passing therethrough is modified in another way, and when portions on the respective screens intermediate the projections and depressions are opposite each other still further modifications of the light passing therethrough are achieved. The modified screens 72' and 75', like the screens 72 and 75 in Fig. 1, may, as shown, have defined angularly disposed sections 73' and 76' of different colors. However, by having different portions of the respective superposed screens spaced from each other different distances and also, if desired and as shown, by having certain portions in the screens at an angle to the light source, unique light effects may be produced even without using screens having defined sections 73' and 76' of different color.

Variations and modifications may be made within the scope of this invention and portions of the improvements may be used without others.

Having thus described the invention, what is claimed as new is:

1. In a device of the character described, an inner light screen disposed to define an inner sphere; an outer light screen disposed to define an outer sphere, about said inner sphere, said inner and outer light screens being so formed and disposed relative to each other that adjacent superposed portions thereof are spaced different distances apart; a light source disposed within said inner sphere; means for mounting said inner and outer screens for rotatory movement about a common axis of rotation passing substantially through the centers of said defined spheres; means for rotating said screens to cause relative movement therebetween; and defined sections in each of said screens, having different light-transmitting characteristics, the sections in at least one of said screens being disposed at an angle relative to the line of rotatory movement as defined by a point on said screen spaced from the axis of rotation.

2. In a device of the character described, at least two superposed light screens adapted to encircle a light source, said light screens being so formed and disposed relative to each other that adjacent superposed portions thereof are spaced different distances apart; means for moving said screens in opposite directions about said light source; and adjoining sections in each of said superposed screens, having different color light-transmitting characteristics, and being inclined relative to the direction of screen movement.

3. In a device of the character described, a pair of superposed light screening surfaces, movable laterally relative to each other, said light-screening surfaces being so formed and disposed relative to each other that adjacent superposed portions thereof are spaced different distances apart; means for moving said screening surfaces relative to each other; and means for projecting light through said superposed screening surfaces.

4. In a device of the character described, at least two superposed light-transmitting screens adapted to be so located relative to a light source that the light therefrom passes successively through said screens, said screens being movable laterally relative to each other and each of said screens having wavy surface portions adapted to space the superposed portions of the screens different distances apart; and means for moving said screens laterally relative to each other to vary the spacing between said screens at any given point as the wavy portions of the respective screens pass each other.

CLEVELAND BRONNER, Sr.